United States Patent
Yasukaga et al.

(10) Patent No.: US 10,165,137 B2
(45) Date of Patent: Dec. 25, 2018

(54) IMAGE FORMING APPARATUS, INFORMATION DISPLAY METHOD, AND COMPUTER-READABLE RECORDING MEDIUM STORING PROGRAM

(71) Applicant: KONICA MINOLTA, INC., Chiyoda-ku, Tokyo (JP)

(72) Inventors: Masayuki Yasukaga, Hachioji (JP); Yuji Uchida, Tachikawa (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 15/202,228

(22) Filed: Jul. 5, 2016

(65) Prior Publication Data

US 2017/0026529 A1 Jan. 26, 2017

(30) Foreign Application Priority Data

Jul. 22, 2015 (JP) ................................. 2015-144608

(51) Int. Cl.
*H04N 1/00* (2006.01)

(52) U.S. Cl.
CPC . *H04N 1/00464* (2013.01); *H04N 2201/0082* (2013.01)

(58) Field of Classification Search
CPC .................. H04N 1/00464; H04N 2201/0082
See application file for complete search history.

(56) References Cited

U.S. PATENT DOCUMENTS

| 2009/0287684 | A1* | 11/2009 | Bennett | G06F 17/3089 |
| 2016/0309057 | A1* | 10/2016 | Kawakami | H04N 1/4413 |
| 2017/0208190 | A1* | 7/2017 | Toscano | H04N 1/00209 |

FOREIGN PATENT DOCUMENTS

JP 11015847 A 1/1999

* cited by examiner

*Primary Examiner* — Iriana Cruz
(74) *Attorney, Agent, or Firm* — Holtz, Holtz & Volek PC

(57) ABSTRACT

In an image forming apparatus using a browser with limitation, contents input in an input form cannot be stored in the browser, and thus the contents displayed on a browser screen cannot be taken over between a plurality of pages.

A browser portion of an image forming apparatus holds a parameter operated on and input into a child page in a memory region for browser assigned to a parent page and displays, on a browser screen, another child page after transition which takes over the parameter from the child page before the transition.

19 Claims, 6 Drawing Sheets

FIG. 5

PARTS REPLACEMENT

SELECTED PARTS CONFIRMATION

Keyword: [ ] Search

| No. | ☐ | PART NAME | PART NUMBER | COUNT | LIFE CYCLE (%) | START DATE | PREVIOUS-TIME COUNTER | NUMBER OF RESET TIMES |
|---|---|---|---|---|---|---|---|---|
| 1 | ☑ | WASTE TONER BOX | A0000001 | 153463 | 118 | 00/00/00 | 0 | 0 |
| 20 | ☑ | CHARGE ELECTRODE/K (TIME %) | A0000002 | 72 | 72 | 14/01/20 | 0 | 0 |
| 14 | ☐ | CHARGE ELECTRODE/Y (TIME %) | A0000003 | 66 | 66 | 14/01/20 | 0 | 0 |
| 16 | ☐ | CHARGE ELECTRODE/M (TIME %) | A0000004 | 66 | 66 | 14/01/20 | 0 | 0 |
| 18 | ☐ | CHARGE ELECTRODE/C (TIME %) | A0000005 | 65 | 65 | 14/01/20 | 0 | 0 |
| 78 | ☑ | SECONDARY TRANSFER ROLLER /Lw DISCHARGE TIME (%) | A0000006 | 38 | 38 | 14/01/20 | 0 | 0 |
| 54 | ☐ | TRANSFER BELT CLEANING BLADE (TIME %) | A0000007 | 37 | 37 | 14/02/18 | 4 | 5 |
| 71 | ☐ | TONER TRANSFER SHEET (TIME %) | A0000008 | 37 | 37 | 14/02/18 | 4 | 3 |
| 72 | ☐ | SIDE RAIL (TIME %) | A0000009 | 37 | 37 | 14/02/18 | 4 | 3 |
| 68 | ☐ | PRIMARY TRANSFER ROLLER/K (TIME %) | A0000010 | 33 | 33 | 14/02/01 | 1 | 2 |
| 79 | ☐ | SEPARATION DISCHARGE PLATE UNIT, DISCHARGE TIME (%) | A0000011 | 33 | 33 | 14/01/20 | 0 | 0 |
| 65 | ☐ | PRIMARY TRANSFER ROLLER/Y (TIME %) | A0000012 | 29 | 29 | 14/02/01 | 1 | 2 |

FIG. 6

PARTS REPLACEMENT

COUNTER OF CHECKED PART CAN BE CLEARED.

COUNTER CLEAR    ADJUSTMENT PROCEDURE

Keyword: [ ] Search

| No. | ☐ | PART NAME | PART NUMBER | COUNT | LIFE CYCLE (%) | START DATE | PREVIOUS-TIME COUNTER | NUMBER OF RESET TIMES |
|---|---|---|---|---|---|---|---|---|
| 1 | ☑ | WASTE TONER BOX | A0000001 | 153463 | 118 | 00/00/00 | 0 | 0 |
| 20 | ☑ | CHARGE ELECTRODE/K (TIME %) | A0000002 | 72 | 72 | 14/01/20 | 0 | 0 |
| 78 | ☑ | SECONDARY TRANSFER ROLLER /Lw DISCHARGE TIME (%) | A0000006 | 38 | 38 | 14/01/20 | 0 | 0 |

IMAGE FORMING APPARATUS, INFORMATION DISPLAY METHOD, AND COMPUTER-READABLE RECORDING MEDIUM STORING PROGRAM

BACKGROUND OF THE INVENTION

Field of the Invention

The present invention relates to, for example, an image forming apparatus for displaying various types of information on a browser screen, an information display method, and a computer-readable recording medium storing a program.

Description of the Related Art

Conventionally, in an image forming apparatus such as MFP (Multi Function Peripherals), an operation screen (for example, a maintenance tool) is displayed on an operation display portion by the browser. The browser is for displaying, for example, an html page including html (Hyper Text Markup Language) contents, and is displayed generally on a display device of a client terminal. The client terminal can transmit an HTTP (Hypertext Transfer Protocol) request to a server through a communication line and display data received from the server on the browser screen. In the image forming apparatus, a portion corresponding to the client terminal is a browser portion for controlling the browser, and a portion corresponding to the server is a server processing portion provided in the image forming apparatus. A predetermined memory region is assigned in the server processing portion, and information can be held in the memory region.

The HTTP request to be transmitted by the client terminal to the server is constituted of a request line, a header portion, and a body portion, and a GET method or a POST method is used.

The GET method is for transmitting the HTTP request to the server by adding information (data, parameters and the like) to a character string after a URL (Uniform Resource Locator) included in the request line. The number of characters in the URL that can be transmitted by the GET method has limitation. In addition, the client terminal can transmit text data to the server by using the GET method, but cannot transmit binary data.

The POST method is for transmitting the HTTP request to the server by describing information in the body portion. The POST method is capable of transmitting both text data and binary data. The client terminal can receive data to be displayed on a subsequent html page together with the subsequent html page from the server by using the POST method when making a request to the server for displaying the subsequent html page of the server from the html page currently displayed.

Technologies for displaying such html contents on the browser screen include the one disclosed in, for example, Patent Literature 1. Patent Literature 1 discloses the technology of storing, under an arbitrary name at an arbitrary place, an HTML file corresponding to contents displayed on a screen region (first frame) occupying a considerable portion of the screen by a file storing function of the browser.

RELATED ART DOCUMENT

Patent Document

Patent Literature 1: Japanese Patent Laid-Open No. 11-15847

DISCLOSURE OF THE INVENTION

Problems to be Solved by the Invention

An image forming apparatus handles information with high confidentiality in many cases. Accordingly, a browser with limitation which limits functions which are highly likely to receive information leakage attacks such as cookie and the POST method is used in the image forming apparatus. Regarding the cookie, one of reasons of limited execution also includes the fact that a storage place of the cookie which is usually stored in an HDD cannot be prepared if the image forming apparatus does not include an HDD (Hard Disk Drive).

The browser with limitation as described above has one problem. In a general browser, the GET method, the POST method, the cookie and the like are used for delivery of information such as contents input in a form and a check position in a check box, when the html page makes a transition. However, delivery of information is limited in the browser with limitation.

Note that even the browser with limitation can use the GET method. However, the number of characters in the URL increases as a size of data transmitted by the client terminal (browser portion) to the server (server processing portion) becomes larger in the GET method, and thus a large quantity of data cannot be transmitted to the server due to the limitation on the URL length. Accordingly, it has been difficult for the browser with limitation to execute processing of constituting an html page in which a maintenance target is selected by, for example, a user, and of delivering data with contents selected in the html page to another html page.

Incidentally, it is possible to temporarily store the information in a memory region assigned by the server processing portion in order to take over the information between the html pages before and after the transition. However, since an information amount of the information capable of delivering the html contents is varied depending on the contents of the html page or the selection by the user, the data size of the information is not fixed. In order to handle the html contents including the information with a large data size, the server processing portion needs to ensure a region preliminarily assumed in the memory region assigned to the server processing portion at all times while the browser is being displayed, which causes a trouble in performing another processing by the server processing portion. In addition, the memory region assigned to the server processing portion can handle only a data structure having alignment preliminarily specifying which information is recorded in which region, thereby complicating management of the information by the server processing portion.

Note that, when a general homepage is displayed on the browser screen, and when the user performs operations of a "back" button, a "forward" button and the like displayed on a tool bar on the browser screen, the contents having been previously input in the input form seem to remain while being still stored. The reason why the contents seem to remain like this is because functions of the GET method, the POST method, the Cookie and the like are used. However, in the case of the browser with limitation used in the image forming apparatus, the POST method, the Cookie and the like cannot be used, and the contents input in the input form cannot be stored in the browser.

Furthermore, the technology disclosed in Patent Literature 1 has a purpose of customizing page history display, and a target of data to be held by data holding unit disclosed in Patent Literature 1 is only a page history (for example, a character string constituting a URL). Moreover, the page history held by the data holding unit disclosed in Patent Literature 1 is only information used in the browser as a whole, and specific information used in the image forming apparatus is not held.

The present invention has been made in view of these circumstances, and an object of the present invention is to take over contents displayed on the browser screen between a plurality of pages, in the image forming apparatus displaying the information by using, for example, a browser with limitation in which delivery of the information between the pages is limited.

SUMMARY OF THE INVENTION

Means for Solving the Problem

In order to realize at least one of the aforementioned objects, an image forming apparatus reflecting one aspect of the present invention includes an operation display portion and a browser portion.

The operation display portion displays information on a browser screen and allows an operation input is performed by a user.

The browser portion generates a parent page for displaying contents including the information on the browser screen and a child page corresponding to the parent page, assigns a memory region for browser to the parent page, and displays the child page on the browser screen.

Then, the browser portion holds a parameter operated on and input into the child page in the memory region for browser and displays, on the browser screen, another child page after transition which takes over the parameter from the child page before the transition.

Note that the aforementioned image forming apparatus is an aspect of the present invention, and a method reflecting the one aspect of the present invention, a computer-readable recording medium storing a program and the like also have a configuration similar to that of the image forming apparatus reflecting the one aspect of the present invention.

BRIEF DESCRIPTION OF THE DRAWINGS

FIG. 5 is a user interface diagram illustrating a display example of a part selection html page according to the embodiment of the present invention.

FIG. 6 is a user interface diagram illustrating a display example of a selected parts confirmation html page according to the embodiment of the present invention.

DESCRIPTION OF THE PREFERRED EMBODIMENTS

Figure 1:
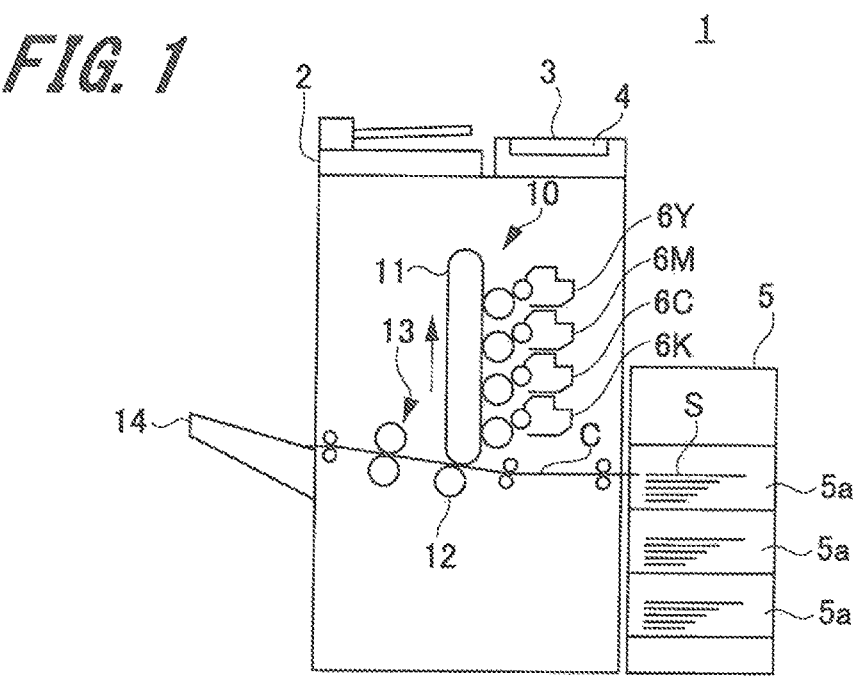
FIG. 1 is a schematic view illustrating a hardware configuration example of an image forming apparatus according to an embodiment of the present invention.

An embodiment of the present invention will be described below by referring to the attached drawings. In the description and the drawings, the same reference numerals are attached to constituent elements having substantially the same functions or configurations, and thus duplicated explanation is omitted.

<Hardware Configuration Example of Image Forming Apparatus>

FIG. 1 is a schematic view illustrating a hardware configuration example of an image forming apparatus 1.

The image forming apparatus 1 employs an electrophotographic system for forming an image by using static electricity and is a tandem-type color image forming apparatus in which toner images of four colors of, for example, yellow (Y), magenta (M), cyan (C), and black (K) are overlapped. The image forming apparatus 1 has an auto document feeder (ADF) 2, an operation display portion 3, a sheet feeding device 5, an image forming portion 10, an intermediate transfer belt 11 (image carrier), a secondary transfer portion 12, and a fixing portion 13.

The auto document feeder 2 automatically feeds documents in reading the documents. In addition, a scanner, not shown, provided in the auto document feeder 2 can read images of a document placed on an upper platen glass of the image forming apparatus 1 and a document automatically conveyed by the auto document feeder 2.

The operation display portion 3 includes a function as an operation portion instructing start of a job such as image forming processing. The operation display portion 3 has an LCD (Liquid Crystal Display) 4 installed. The LCD 4 is constituted of a touch panel and allows an operation by a user and display of information. The LCD 4 serves both as an operation portion and a display portion. Note that the operation portion can be constituted of a mouse or a tablet and separately from the display portion.

The sheet feeding device 5 includes a plurality of sheet storage portions 5a depending on a size or a type of the sheet. In the sheet feeding device 5, when the corresponding sheet storage portion 5a is selected on the basis of an instruction from the image forming apparatus 1, a sheet S is taken out of the sheet storage portion 5a by a sheet feeding portion, not shown, and the sheet S is fed to a conveyance path C.

The image forming portion 10 includes four image forming units 6Y, 6M, 6C, and 6K for forming a toner image of yellow (Y), a toner image of magenta (M), a toner image of cyan (C), and a toner image of black (K). The image forming portion 10 forms the toner images of Y, M, C, and K by controlling operations of the image forming units 6Y, 6M, 6C, and 6K of the image forming portion 10. In addition, the image forming apparatus 1 also includes a plurality of rollers (conveyance rollers) for conveying the sheet S to the conveyance path C. These rollers are usually constituted of a roller pair.

The image forming apparatus 1 electrically charges photoreceptors of the image forming units 6Y, 6M, 6C, and 6K, and forms electrostatic latent images on the photoreceptors by erasing charges and by exposing the photoreceptors, in an image forming mode. Then, toner is caused to adhere to the electrostatic latent images on the photoreceptors of yellow, magenta, cyan, and black by using a development portion to thereby form the toner images of each color. Subsequently, the toner images formed on the photoreceptors of yellow, magenta, cyan, and black are primarily transferred sequentially on a surface of the intermediate transfer belt 11 rotating in an arrow direction.

Next, the toner images of the respective colors primarily transferred onto the intermediate transfer belt 11 are secondarily transferred by a secondary transfer portion 12 (secondary transfer roller) to the sheet S supplied from the sheet feeding device 5 and conveyed by the roller. The secondary transfer of the toner images of the respective colors on the intermediate transfer belt 11 onto the sheet S forms a color image. The image forming apparatus 1 conveys the sheet S on which the color toner image has been formed, to the fixing portion 13.

The fixing portion 13 is a device for executing fixing processing on the sheet S on which the color toner image is formed. The fixing portion 13 fixes the transferred toner image on the sheet S by pressurizing and heating the sheet S having been conveyed. The fixing portion 13 is constituted of a fixing upper roller and a fixing lower roller which are, for example, fixing members. The fixing upper roller and the fixing lower roller are arranged in a state of pressure-contact with each other, and a fixing nip portion is formed as a pressure-contact portion between the fixing upper roller and the fixing lower roller.

A heating portion, not shown, is provided inside the fixing upper roller. A roller portion located on an outer peripheral portion of the fixing upper roller is heated by radiant heat from the heating portion. The sheet S is conveyed to the fixing nip portion so that a surface on which the toner image has been transferred by the secondary transfer portion 12 (fixing target surface) faces the fixing upper roller. The sheet S passing through the fixing nip portion is subjected to pressurization by the fixing upper roller and the fixing lower roller and heating by the heat of the roller portion of the fixing upper roller. The sheet S subjected to the fixing processing by the fixing portion 13 is discharged to a sheet ejection tray 14.

Figure 2:
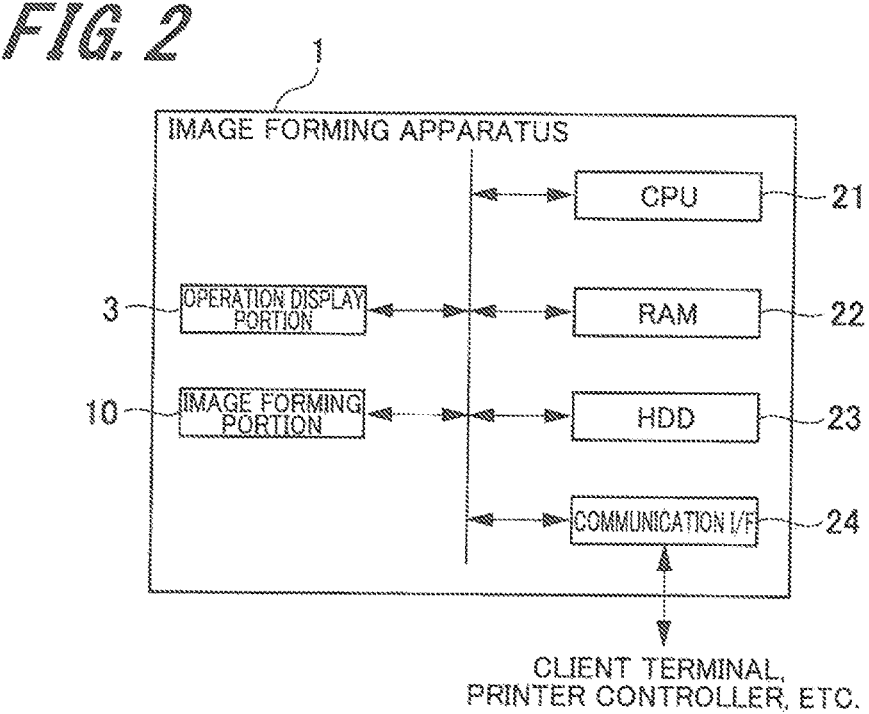
FIG. 2 is a hardware configuration diagram illustrating a configuration example of a major portion of the image forming apparatus according to the embodiment of the present invention.

FIG. 2 is a hardware configuration diagram illustrating a configuration example of a major portion of the image forming apparatus 1.

The image forming apparatus 1 includes a CPU (Central Processing Unit) 21, a RAM (Random Access Memory) 22, an HDD 23, and a communication I/F (Interface) 24 in addition to the aforementioned operation display portion 3 and the image forming portion 10.

The CPU 21 is used as an example of a computer controlling an operation of each portion in the image forming apparatus 1. The CPU 21 controls image forming processing (printing operation) of the image forming portion 10 on the basis of, for example, a print instruction by the user given through the operation display portion 3.

The RAM 22 temporarily stores information (data) required for each processing performed by the CPU 21. The RAM 22 is used as an example of a volatile memory.

The HDD 23 records a program, data and the like required for the CPU 21 to operate and is used as an example of a computer-readable and non-transient recording medium storing the program executed by the image forming apparatus 1. Accordingly, the program is permanently stored in the HDD 23. Note that the computer-readable and non-transient recording medium storing the program executed by the image forming apparatus 1 is not limited to the HDD 23 but may be a recording medium such as a CD-ROM or a DVD-ROM.

The HDD 23 is used as an example of a non-volatile memory capable of recording setting information or the like set in advance in the image forming apparatus 1, for a long period of time. An SSD (Solid State Drive) is used as an example of a non-volatile memory instead of the HDD, in some cases. A function of each block illustrated in FIG. 3 which will be described later is realized by execution of the program, data and the like, read out by the CPU 21 from the HDD 23. The HDD 23 is also referred to as a "main memory" in explanation below.

The communication I/F 24 executes processing of transmitting/receiving data via a communication line to/from a client terminal, a printer controller or the like, not shown, connected to the image forming apparatus 1.

Figure 3:
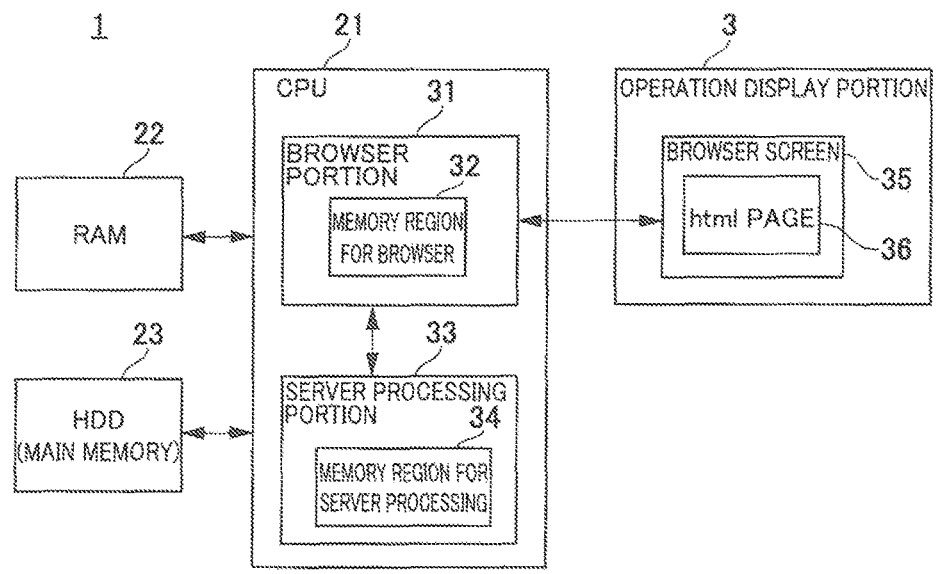
FIG. 3 is a functional block diagram of the image forming apparatus according to the embodiment of the present invention.

FIG. 3 is a functional block diagram of the image forming apparatus 1.

The CPU 21 operates a browser portion 31 and a server processing portion 33.

The browser portion 31 is a software program displaying a browser screen 35 on the operation display portion 3 and ensures a memory region 32 for browser in the RAM 22. FIG. 3 illustrates the functional block diagram assuming that the browser portion 31 has the memory region 32 for browser for convenience of explanation. The browser portion 31 functions as a browser task started when the image forming apparatus 1 is powered on.

The browser screen 35 displayed on the operation display portion 3 by the browser portion 31 is a browser with limitation, which limits delivery of information between pages for the security reasons, and execution of functions of cookie, the POST method and the like, for example, is limited. An html page 36 including html contents (an example of contents described in a predetermined markup language) is displayed on the browser screen 35.

The browser portion 31 generates a parent page for displaying, on the browser screen 35, the html contents including information that can be used by the user and a child page corresponding to the parent page. Then, the browser portion 31 can assign the memory region 32 for browser to the parent page and display the child page on the browser screen 35. The browser portion 31 holds parameters (check items, variables and the like) operated on and input into the child page by the user in the memory region 32 for browser, and displays, on the browser screen 35, another child page after transition which takes over the parameters from the child page before the transition. At this time, the browser portion 31 displays the content including the information read out from the memory region 32 for browser and a memory region 34 for server processing on the child page.

A server processing portion 33 is a software program for controlling processing of the entire image forming apparatus 1 and ensures the memory region 34 for server processing in the RAM 22. FIG. 3 illustrates the functional block diagram assuming that the server processing portion 33 has the memory region 34 for server processing for convenience of explanation. The server processing portion 33 is the software program which writes the information in the main memory and reads out the information from the main memory. Note that the information is stored in the RAM 22 or in the main memory in accordance with the type of the information.

The html page 36 is displayed on the browser screen 35 by using the configuration of a parent page having an inline frame and a child page displayed in the inline frame. The parent page and the child page are constituted by being hierarchized, and the information read out by the browser portion 31 from the main memory through the server processing portion 33 and the information acquired from the memory region 32 for browser are displayed on the child page. In addition, when page transition is performed between a plurality of the child pages, the child pages after the transition can take over the information from the child page before the transition by holding of the information by the parent page in the memory region 32 for browser.

The browser portion 31 uses separately two types of information holding portions (the memory region 32 for browser and the main memory) in accordance with the type of the information. The information not required to be held after the parent page is closed is temporarily held in the memory region 32 for browser. The information held in the memory region 32 for browser includes information temporarily used such as a result of selection by the user input into the check box item selected by the user and an operation result to the child page.

On the other hand, the information stored in the main memory includes information to be held for a long period of time even after the parent page is closed along with the completion of the operation of the browser portion 31 (for example, setting information of the image forming apparatus 1, a setting history of the user, comments and the like). Furthermore, since a region for holding a set value of the image forming apparatus 1 is prepared in advance in the main memory, information not newly requiring a memory region (for example, a counter value of consumables, a default value of copy job setting and the like) is also stored in the main memory.

Figure 4:
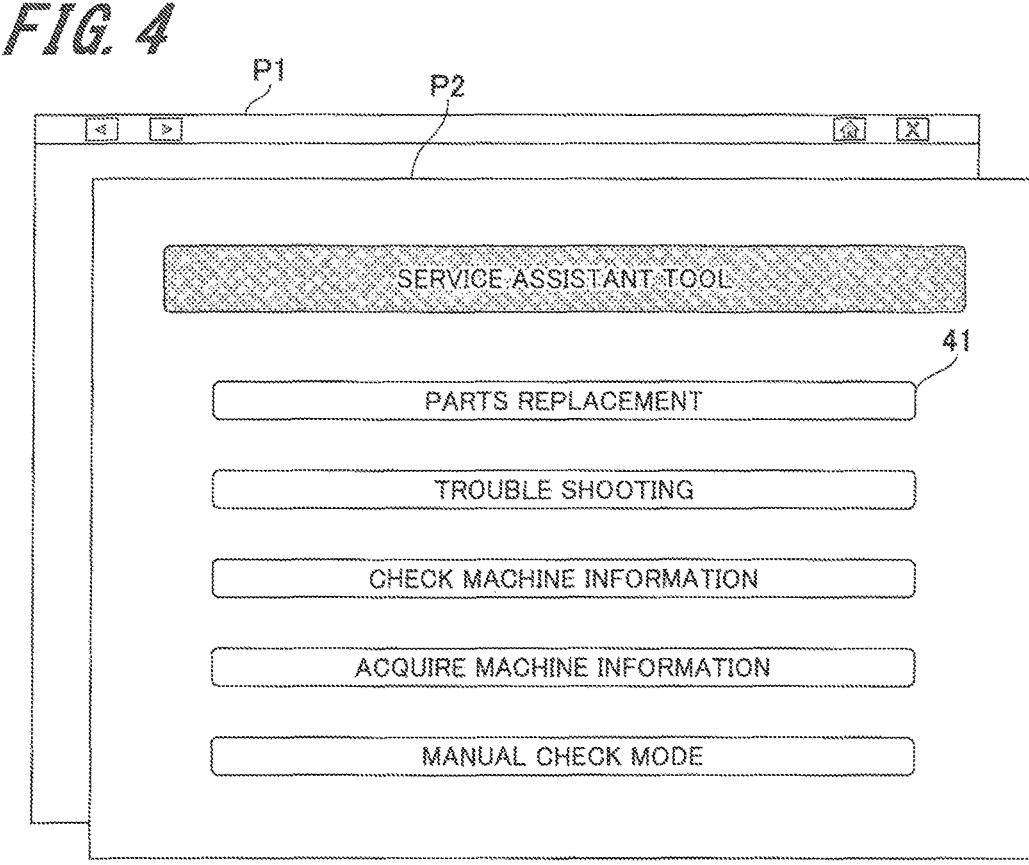
FIG. 4 is a user interface diagram illustrating a display example of a parent page and a service assistant tool html page according to the embodiment of the present invention.

FIG. 4 is a user interface diagram illustrating a display example of a parent page P1 and a service assistance tool html page P2.

The parent page P1 and the service assistant tool html page P2 are both a part of the html contents displayed on the browser screen 35 by the browser portion 31. However, the parent page P1 is only provided formally in this embodiment. The service assistant tool html page P2 is an example of the child page displayed on the browser screen 35 by superposing the parent page P1. In addition, in FIG. 4, each of screen sizes of the parent page P1 and the service assistant tool html page P2 is set to the same as a display area of the operation display portion 3. Furthermore, in FIG. 4, there is illustrated an example in which the parent page P1 and the service assistant tool html page P2 are shifted from each other for display in order that a relation between them may be easily understood, but the parent page P1 is not displayed on an actual browser screen 35.

The service assistant tool html page P2 includes, as html contents, an operation screen for the user as a maintenance worker to perform a work. A trouble shooting button, a machine information confirmation button, a machine information acquisition button, and a manual check mode button are displayed on the service assistant tool html page P2 in addition to a parts replacement button 41.

When a power button, not shown, of the image forming apparatus 1 is turned on, the browser portion 31 starts an operation. In addition, the browser portion 31 operates the parent page P1 on a background of the browser screen 35 and displays the service assistant tool html page P2 on a foremost surface of the browser screen 35.

FIG. 5 is a user interface diagram illustrating a display example of a part selection html page P3.

When the user presses down the parts replacement button 41 in the service assistant tool html page P2, the part selection html page P3 is displayed on the browser screen 35 by the browser portion 31, instead of the service assistant tool html page P2. The part selection html page P3 is an example of the child page displayed on the browser screen 35 by superposing the parent page P1.

The part selection html page P3 includes, as the html contents, information on periodic replacement parts obtained by the browser portion 31 from the main memory via the server processing portion 33. The information displayed on the part selection html page P3 includes a parts No., a part name, a part number, a counter value, a life cycle (% indication relative to a maximum life), a use start date, previous-time counter, and a number of reset times. The life is a value indicating a time serving as a guide for the user to replace a constituent component of the image forming apparatus 1, a use amount, a use time or the like of the constituent component. It is preferable that the user replaces the constituent component before the life cycle reaches 100%.

When the user inputs a check in a check box 42 for replacement part selection with respect to a part item of parts to be replaced, and presses down a selected parts confirmation button 43, the information on the checked part item is held in the memory region 32 for browser by java script (registered trademark) executed by the browser portion 31 on the browser screen 35. After that, transition is made from the part selection html page P3 to the selected parts confirmation html page P4.

FIG. 6 is a user interface diagram illustrating a display example of the selected parts confirmation html page P4.

The selected parts confirmation html page P4 displays a list of parts selected by the user in the part selection html page P3 before the transition. The selected parts confirmation html page P4 is an example of the child page displayed on the browser screen by superposing the parent page P1. The selected parts confirmation html page P4 is constituted of: information on the part item acquired by the browser portion 31 from the memory region 32 for browser and checked by the user; and the counter values and the life cycle information of the parts, which are acquired from the main memory through the server processing portion 33.

When the browser portion 31 displays the selected parts confirmation html page P4 on the browser screen 35 as described above, the browser portion 31 constitutes the selected parts confirmation html page P4 by combining the information read out from the memory region 32 for browser and the information read out from the main memory. In addition, the selected parts confirmation html page P4 displays only part items each having a check input in the check box 42 for replacement part selection of the part selection html page P3. However, the information read out by the browser portion 31 from the main memory through the server processing portion 33 is displayed for the values requiring real-time display such as the counter value indicated on a count 44 and the life cycle value indicated in a life cycle 45. When replacement of the displayed parts is completed, the user presses down a counter clear button 46.

Figure 7:
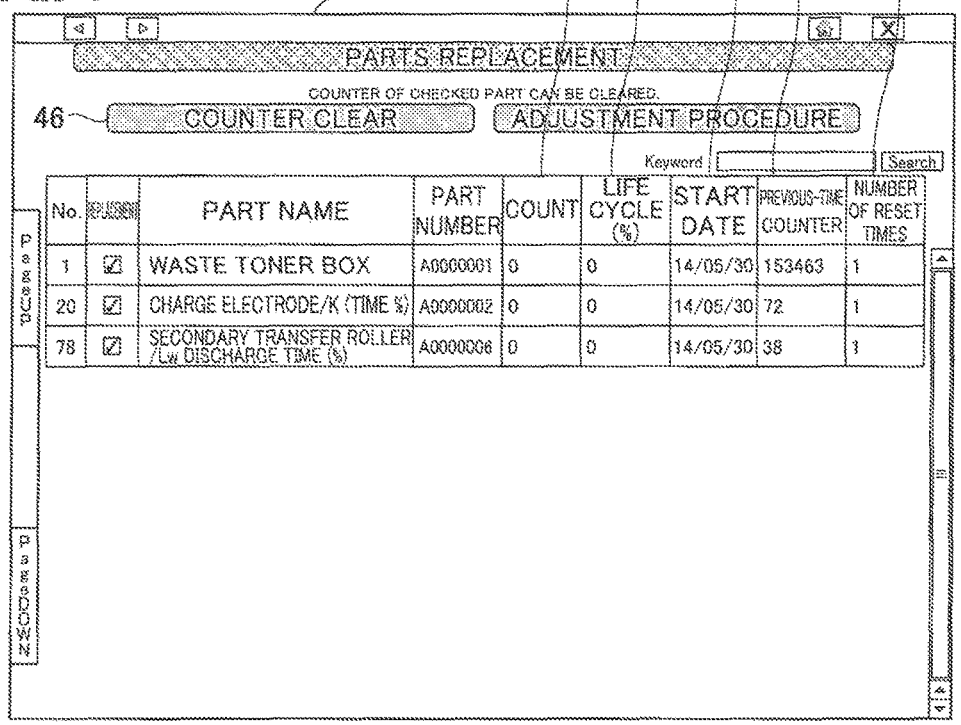
FIG. 7 is a user interface diagram illustrating a display example of a selected parts confirmation html page after counter-clear according to the embodiment of the present invention.

FIG. 7 is a user interface diagram illustrating a display example of the selected parts confirmation html page P4 after counter-clear.

When the counter clear button 46 of the selected parts confirmation html page P4 is pressed, the selected parts confirmation html page P4 in which each of the values in the count 44 and the life cycle 45 has been cleared to "0" is displayed on the browser screen 35. At this time, the server processing portion 33 rewrites the counter values of the parts stored in the main memory to "0". Then, a date when the counter value is cleared is stored in a start date 47. Furthermore, before the counter clear button 46 is pressed, the counter value stored in the count 44 is moved to a previous-time counter 48, and "1" indicating a number of times when the counter clear button 46 is pressed is stored in a reset number of times 49. The values stored in the previous-time counter 48 and the reset number of times 49 are also stored in the main memory.

Figure 8:
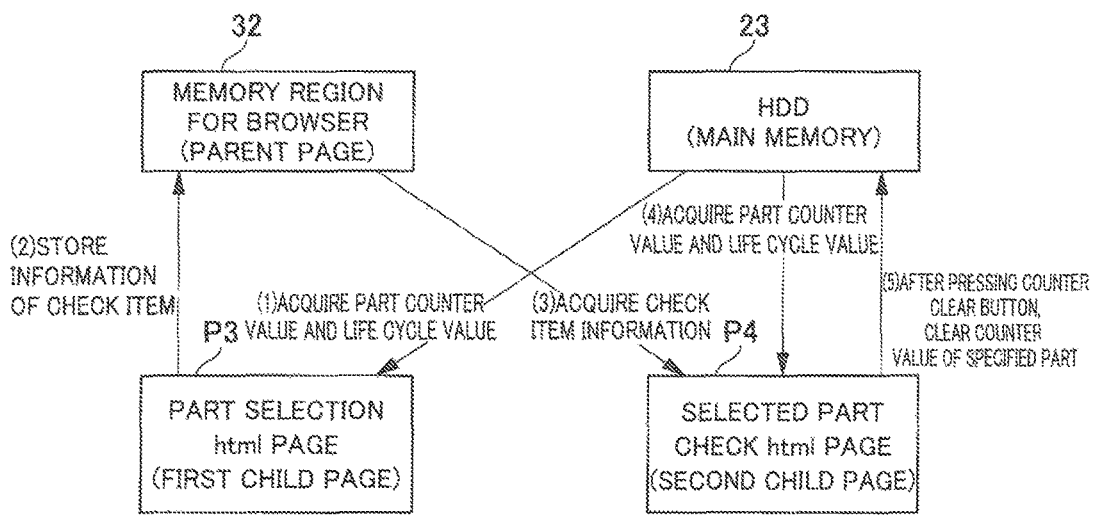
FIG. 8 is an explanatory diagram illustrating an example of a flow of data among each html page, a memory region for browser, and a main memory according to the embodiment of the present invention.

FIG. 8 is an explanatory diagram illustrating an example of a flow of data among each of the html pages, the memory region 32 for browser, and the main memory. Numerals (1) to (5) in the figure indicate an order of the data flow, which will be described together with flowcharts in FIGS. 9 and 10.

Note that, in order to hold the information (data) between a plurality of child pages performing transition, it is assumed that a kind of data (data type) held by the memory region 32 for browser is not limited. The data types of the data held by the memory region 32 for browser include, for example, numeral values, character strings, and Boolean.

Figure 9:
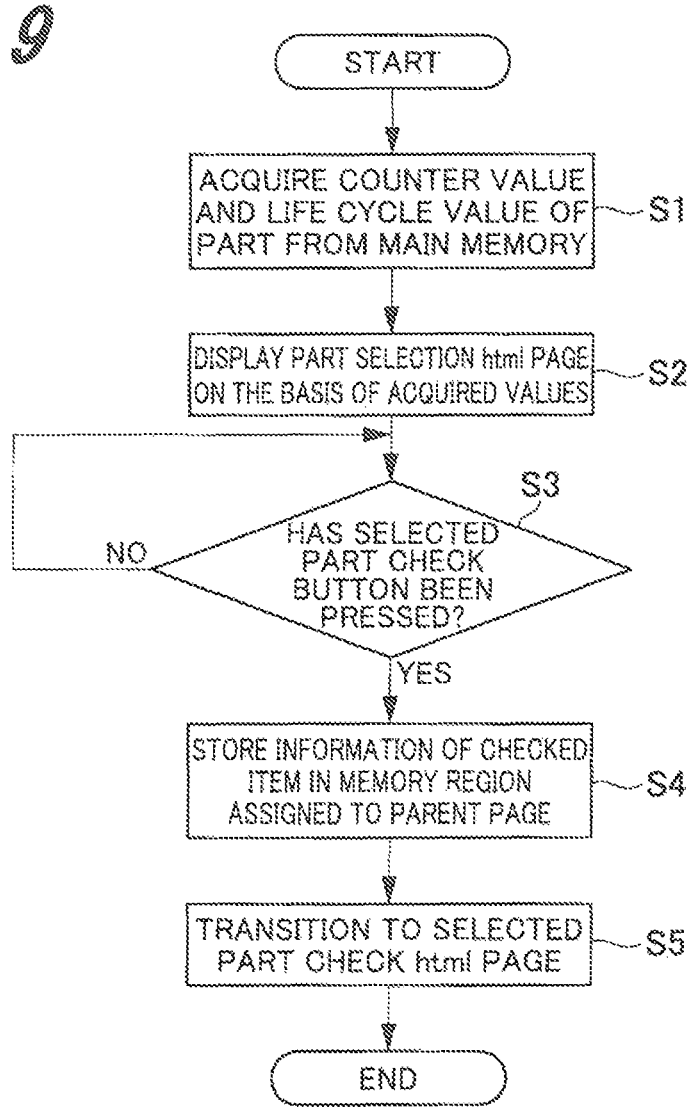
FIG. 9 is a flowchart illustrating a processing example for a server processing portion and a browser portion according to the embodiment of the present invention to display the part selection html page.

FIG. 9 is a flowchart illustrating a processing example for the server processing portion 33 and the browser portion 31 to display the part selection html page P3.

(1) After the parts replacement button 41 of the service assistant tool html page P2 is pressed, the server processing portion 33 stores the counter value of the component acquired from the main memory and the life cycle value, in the memory region 34 for server processing (S1). Then, the server processing portion 33 performs control for displaying the part selection html page P3 on the browser portion 31 on the basis of the value stored in the memory region 34 for server processing (S2). At this time, the browser portion 31 displays the part selection html page P3 on the browser screen 35 on the basis of the value stored in the memory region 34 for server processing.

Next, the browser portion 31 determines whether or not the selected parts confirmation button 43 has been pressed by the user (S3). If the selected parts confirmation button 43 has not been pressed (NO at S3), the browser portion 31 repeats determination at Step S3.

(2) If the selected parts confirmation button 43 has been pressed (YES at S3), the browser portion 31 stores information (one example of parameters) of the item having a check input in the replacement part selection check box 42, in the memory region 32 for browser assigned to the parent page P1 (S4). Then, the browser portion 31 makes a transition to the selected parts confirmation html page P4 (S5).

Figure 10:
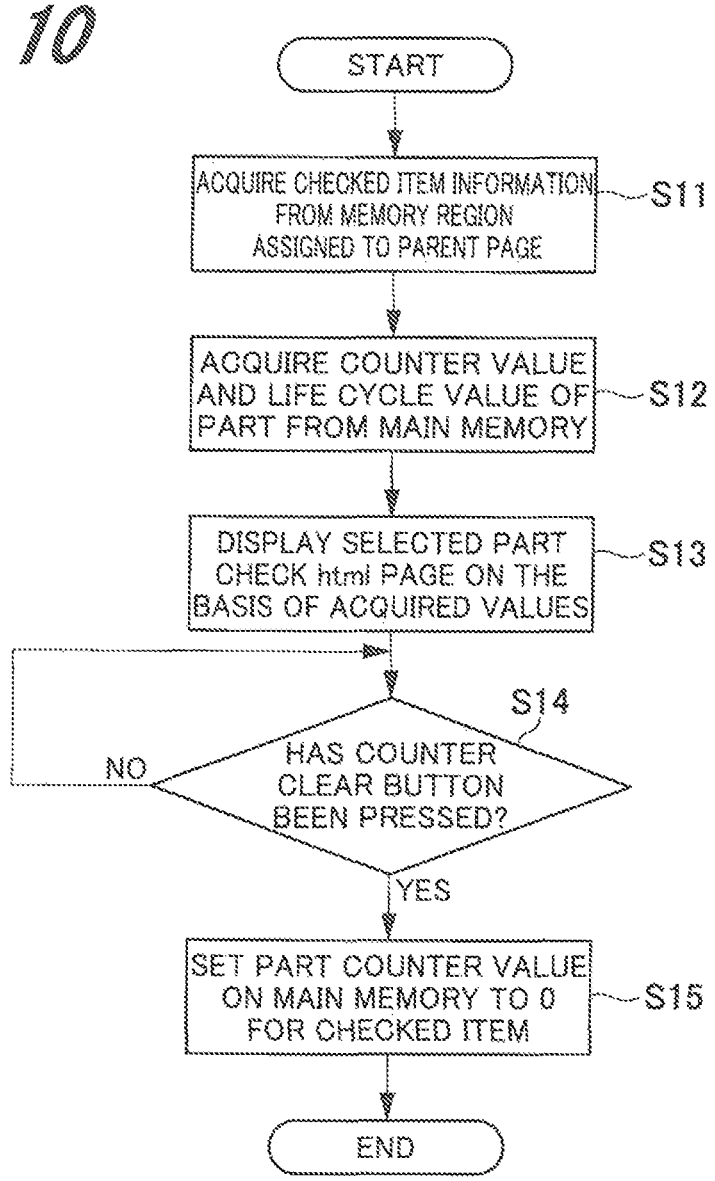
FIG. 10 is a flowchart illustrating a processing example for the server processing portion and the browser portion according to the embodiment of the present invention to display the selected parts confirmation html page.

FIG. 10 is a flowchart illustrating a processing example for the server processing portion 33 and the browser portion 31 to display the selected parts confirmation html page P4.

(3) The browser portion 31 acquires the information of the item having a check input in the check box 42 for replacement part selection, from the memory region 32 for browser assigned to the parent page P1 (S11).

(4) The server processing portion 33 acquires the counter value and the life cycle value of the parts corresponding to the item having a check input in the check box 42 for replacement part selection from the main memory, and stores them in the memory region 34 for server processing (S12). Then, the server processing portion 33 performs control for displaying the selected parts confirmation html page P4 on the browser portion 31 on the basis of the values stored in the memory region 34 for server processing (S13). At this time, the browser portion 31 displays, on the selected parts confirmation html page P4, only the items acquired from the memory region 32 for browser assigned to the parent page P1, the items being check-input.

Subsequently, the browser portion 31 determines whether or not the counter clear button 46 has been pressed by the user (S14). If the counter clear button 46 has not been pressed (NO at S14), the browser portion 31 repeats determination at Step S14.

(5) If the counter clear button 46 has been pressed (YES at S14), the browser portion 31 notifies the server processing portion 33 of the checked item. Then, the server processing portion 33 sets the part counter value stored in the main memory to "0" for the notified item (S15).

In the image forming apparatus 1 according to the embodiment described above, the html page 36 displayed by the browser portion 31 on the browser screen 35 is divided into the parent page and the child page, and the html page 36 is hierarchized so that the child page is displayed in the inline frame of the parent page. In addition, when transition is to be made from one child page to another child page, the information held by the memory region 32 for browser is taken over. Therefore, even in the image forming apparatus 1 in which only the browser with limitation can be used, the information can be utilized between the pages when the plurality of pages is switched. For example, the information input in the html page before transition can be used by the html page after the transition.

Furthermore, since the browser portion 31 holds the information in the memory region 32 for browser, the browser portion 31 can handle information having various data structures and can complete processing in the memory region 32 for browser.

Note that, since the type of data taken over between the pages is not limited, information specific to the image forming apparatus 1 such as: replacement information of the constituent component of the image forming apparatus 1; and progress of troubleshooting can be held in the memory region 32 for browser.

Moreover, even the image forming apparatus using a browser capable of using the cookie, the POST method, the GET method and the like may perform processing by using the browser portion 31 and the server processing portion 33 according to the present embodiment.

In addition, a plurality of the child pages may be simultaneously displayed on the browser screen 35. For example, a configuration may be such that the user can visually recognize an item before and after the transition, by displaying two child pages side by side in an arbitrary direction such as a vertical direction or a lateral direction. Similarly, the parent page and the child page may be simultaneously displayed.

Furthermore, the browser portion 31 can generate the parent page and the child page by employing: various languages such as xml (Extensible markup language) also other than html; and description methods.

Moreover, the present invention is not limited to the aforementioned embodiment, but it is needless to say that other various application examples and modifications can be employed as long as the gist of the present invention described in claims is not departed.

For example, in the embodiment described above, the configuration of the apparatus and the system is explained in detail and specifically in order to explain the present invention so as to be easily understood, and is not necessarily limited to the one including all the configurations explained. In addition, a part of configuration of an embodiment can be replaced by the configuration of another embodiment, and furthermore, the configuration of another embodiment can be added to the configuration of one embodiment. Additionally, regarding a part of the configuration of each of the embodiments, addition of another configuration, deletion or replacement can also be made.

Moreover, control lines or information lines considered to be required for explanation are indicated, and not all the control lines or information lines in a product are indicated. Actually, t may be considered that almost all the configurations are connected to each other.

REFERENCE SIGNS LIST 1 image forming apparatus
3 operation display portion
21 CPU
22 RAM
23 HDD
31 browser portion
32 memory region for browser
33 server processing portion
34 memory region for server processing
35 browser screen
36 html page

What is claimed is:

1. An information control apparatus of an image forming apparatus which is connected to a display that is configured to display information on a browser screen, the information control apparatus comprising:
a first memory which is provided integrally with the information control apparatus; and
a hardware processor which is configured to:
generate a first page for displaying contents including the information on the browser screen, and generate a second page and a third page which correspond to the first page;
display the second page on the browser screen;
store a parameter, including information other than URL parameters, in a memory region of the first memory based on a user operation input via the second page, wherein the memory region is assigned to the first page;
acquire, directly from the memory region of the first memory, the parameter including the information other than URL parameters stored in the memory region of the first memory, in response to an operation to display the third page; and
display, on the browser screen, the third page such that the third page is generated based on the parameter acquired directly from the memory region of the first memory.

2. The information control apparatus according to claim 1, further comprising:
a second memory which is configured to store the information displayed on the browser screen, wherein the second memory is a main memory;
wherein the hardware processor is further configured to read out the information from the main memory and to write the information in the main memory; and
wherein the information is stored in the memory region assigned to the first page or stored in the main memory, in accordance with a type of the information.

3. The information control apparatus according to claim 2, wherein the hardware processor displays, on at least one of the second page and the third page, the contents including the information which is read out from the memory region and from the main memory.

4. The information control apparatus according to claim 2, wherein the first page is a parent page, and the second and third pages are child pages of the parent page, wherein the information stored in the memory region includes information which is not required to be held after the first page is closed in addition to the parameter, and the information stored in the main memory includes information to be held after the first page is closed.

5. The information control apparatus according to claim 2, wherein the first page is a parent page, and the second and third pages are child pages of the parent page, and the hardware processor displays at least one of the second and third pages in an inline frame of the first page.

6. The information control apparatus according to claim 2, wherein the hardware processor displays the first page and at least one of the second and third pages side by side.

7. An image forming apparatus comprising:
the information control apparatus according to claim 1;
the display; and
an image forming portion for forming an image on a print medium.

8. An information control method for an information control apparatus of an image forming apparatus which is connected to a display that is configured to display information on a browser screen, wherein the information control apparatus comprises a first memory which is provided integrally with the information control apparatus, the method comprising:
generating a first page for displaying contents including the information on the browser screen, and generating a second page and a third page which correspond to the first page;
displaying the second page on the browser screen;
storing a parameter, including information other than URL parameters, in a memory region of the first memory based on a user operation input via the second page, wherein the memory region is assigned to the first page;
acquiring, directly from the memory region of the first memory, the parameter including the information other than URL parameters stored in the memory region of the first memory, in response to an operation to display the third page; and
displaying, on the browser screen, the third page such that the third page is generated based on the parameter acquired directly from the memory region of the first memory.

9. The information control method according to claim 8, wherein the information displayed on the browser screen is stored in a second memory or is stored in the memory region, in accordance with a type of the information, wherein the second memory is a main memory.

10. The information control method according to claim 9, further comprising:
reading out the information stored in the memory region and in the main memory, and
displaying, on at least one of the second page and the third page, the contents including the information which is read out from the memory region and from the main memory.

11. The information control method according to claim 9, wherein the first page is a parent page, and the second and third pages are child pages of the parent page, and wherein the information stored in the memory region includes information which is not required to be held after the first page is closed in addition to the parameter, and the information stored in the main memory includes information to be held after the first page is closed.

12. The information control method according to claim 9, wherein the first page is a parent page, and the second and third pages are child pages of the parent page, and at least one of the second and third pages is displayed in an inline frame of the first page.

13. The information control method according to claim 9, wherein the first page and at least one of the second and third pages are displayed side by side.

14. A non-transitory computer-readable medium having stored thereon a program that is executable by a computer of an information control apparatus of an image forming apparatus which is connected to a display that is configured to display information on a browser screen, wherein the information control apparatus comprises a first memory which is provided integrally with the information control apparatus, the program being executable by the computer to perform functions comprising:
   generating a first page for displaying contents including the information on the browser screen, and generating a second page and a third page which correspond to the first page;
   displaying the second page on the browser screen;
   storing a parameter, including information other than URL parameters, in a memory region of the first memory based on a user operation input via the second page, wherein the memory region is assigned to the first page;
   acquiring, directly from the memory region of the first memory, the parameter including the information other than URL parameters stored in the memory region of the first memory, in response to an operation to display the third page; and
   displaying, on the browser screen, the third page such that the third page is generated based on the parameter acquired directly from the memory region of the first memory.

15. The non-transitory computer-readable medium according to claim 14, wherein the information displayed on the browser screen is stored in a second memory or is stored in the memory region, in accordance with a type of the information, wherein the second memory is a main memory.

16. The non-transitory computer-readable medium according to claim 15, wherein the program causes the computer to perform functions further comprising:
   reading out the information stored in the memory region and in the main memory, and
   displaying, on at least one of the second page and the third page, the contents including the information which is read out from the memory region and from the main memory.

17. The non-transitory computer-readable medium according to claim 15, wherein the first page is a parent page, and the second and third pages are child pages of the parent page, wherein the information stored in the memory region includes information which is not required to be held after the first page is closed in addition to the parameter, and the information stored in the main memory includes information to be held after the first page is closed.

18. The non-transitory computer-readable medium according to claim 15, wherein the first page is a parent page, and the second and third pages are child pages of the parent page, and at least one of the second and third pages is displayed in an inline frame of the first page.

19. The non-transitory computer-readable medium according to claim 15, wherein the first page and at least one of the second and third pages are displayed side by side.

* * * * *